(12) United States Patent
Oh et al.

(10) Patent No.: US 10,581,885 B1
(45) Date of Patent: Mar. 3, 2020

(54) REINFORCEMENT LEARNING METHOD IN WHICH DISCOUNT FACTOR IS AUTOMATICALLY ADJUSTED

(71) Applicant: KOREA INTERNET & SECURITY AGENCY, Jeollanam-do (KR)

(72) Inventors: Sung Taek Oh, Jeollanam-do (KR); Woong Go, Jeollanam-do (KR); Mi Joo Kim, Jeollanam-do (KR); Jae Hyuk Lee, Jeollanam-do (KR); Jun Hyung Park, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 16/517,488

(22) Filed: Jul. 19, 2019

(30) Foreign Application Priority Data

Nov. 28, 2018  (KR) .......................... 10-2018-0149567

(51) Int. Cl.
*H04L 29/06* (2006.01)
*G06N 20/00* (2019.01)
*G06N 3/04* (2006.01)

(52) U.S. Cl.
CPC ......... *H04L 63/1416* (2013.01); *G06N 20/00* (2019.01); *H04L 63/1425* (2013.01); *G06N 3/0454* (2013.01)

(58) Field of Classification Search
CPC .......................... H04L 63/1416; H04L 63/1425
(Continued)

(56) References Cited

U.S. PATENT DOCUMENTS 10,042,354 B2 * 8/2018 Chand ..................... G06F 21/54
10,348,752 B2 * 7/2019 Rao ......................... G06N 7/005
(Continued)

FOREIGN PATENT DOCUMENTS

JP      2017-004509 A     1/2017
KR     10-1864286 B1     7/2018
(Continued)

OTHER PUBLICATIONS

Zoph, Barret, and Quoc V. Lee, "Neural Architecture Search with Reinforcement Learning," ICLR 2017, pp. 1-15.
(Continued)

*Primary Examiner* — Longbit Chai
(74) *Attorney, Agent, or Firm* — Sheppard Mullin Richter & Hampton LLP

(57) ABSTRACT

There is provided a reinforcement learning method in which a discount factor is automatically adjusted, the method being executed by a computing device and comprising repeatedly training a reinforcement learning model, which determines an evaluation result of input data, using the input data, wherein the repeatedly training of the reinforcement learning model comprises obtaining first result data which is output as a result of inputting the input data to the reinforcement learning model. obtaining second result data which is the result of evaluating the input data using a first evaluation model. obtaining a first return which is the result of adding a discount factor to a first reward given in consideration of whether the first result data and the second result data match. training the reinforcement learning model using the first return and automatically adjusting the discount factor by considering the second result data.

18 Claims, 7 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2016/0358099 A1 | 12/2016 | Sturlaugson et al. | |
| 2017/0140270 A1 | 5/2017 | Mnih et al. | |
| 2017/0364829 A1 | 12/2017 | Fyffe | |
| 2018/0210406 A1* | 7/2018 | Shimizu | G05B 13/0265 |
| 2019/0102670 A1* | 4/2019 | Ceulemans | G06F 21/6218 |

FOREIGN PATENT DOCUMENTS

| | | |
|---|---|---|
| KR | 10-2018-0089769 A | 8/2018 |
| KR | 10-2018-0090989 A | 8/2018 |
| KR | 10-1886317 B1 | 8/2018 |

OTHER PUBLICATIONS

Notice of Allowance in Korean Patent Application No. 10-2018-0149567, dated Apr. 15, 2019 (no translation available).

\* cited by examiner

FIG. 8

| FIRST EVALUATION MODEL | REINFORCE-MENT LEARNING MODEL | FIRST REWARD | SECOND EVALUATION MODEL | | | DISCOUNT FACTOR |
|---|---|---|---|---|---|---|
| THREAT | NORMAL | (--)REWARD | UNNECESSARY | | | DECREASE |
| THREAT | THREAT | (+)REWARD | UNNECESSARY | | | DECREASE |
| NORMAL | NORMAL | NONE | NECESSARY | THREAT | (-)SECOND REWARD | INCREASE |
| | | | NECESSARY | NORMAL | (+)SECOND REWARD | NO CHANGE |
| NORMAL | THREAT | (-)REWARD | NECESSARY | THREAT | (+)SECOND REWARD | INCREASE |
| | | | NECESSARY | NORMAL | (--)SECOND REWARD | NO CHANGE |

REINFORCEMENT LEARNING METHOD IN WHICH DISCOUNT FACTOR IS AUTOMATICALLY ADJUSTED

This application claims the benefit of Korean Patent Application No. 10-2018-0149567, filed on Nov. 28, 2018, in the Korean Intellectual Property Office, the disclosure of which is incorporated herein by reference in its entirety.

BACKGROUND

1. Field

The present disclosure relates to a method of training a model for evaluating input data based on reinforcement learning and a computing device to which the method is applied, and more particularly, to a reinforcement learning method in which a discount factor reflected in the learning of a model is automatically adjusted in the learning process of the model and a computing device to which the method is applied.

2. Description of the Related Art

Reinforcement learning is a learning method that deals with agents interacting with an environment and achieving goals. An agent sequentially selects actions as time steps proceed. The agent is rewarded based on the effect of an action on the environment, and, based on this reward, a probability distribution over the agent's actions is adjusted such that an action taken by the agent is given the maximum reward.

A reward at each time step needs to be discounted and reflected accordingly as the time step is farther from a present time. A discount factor is suggested to reflect this discount.

By reflecting the concept of the discount factor, the sum of rewards given to an agent may be calculated. The sum Gt of all rewards reflecting the discount factor after a time step t may be calculated by Equation 1 below, and the calculated value is referred to as a return.

$$G_t = R_{t+1} + \gamma R_{t+2} + \ldots = \sum_{k=0}^{\infty} \gamma^k R_{t+k+1}. \quad (1)$$

That is, the probability distribution over an agent's actions is adjusted to maximize the calculated return, and this process can be understood as a learning process of the agent.

The discount factor is usually set to a real number between 0 and 1. It can be understood that a current reward is considered important as the discount factor is closer to 0, and the current reward and a future reward have the same value as the discount factor is closer to 1. The discount factor is generally set to a specific value so that the learning direction of a model is reflected at the start of reinforcement learning.

SUMMARY

Aspects of the present disclosure provide a reinforcement learning method in which the direction of reinforcement learning is adjusted as a discount factor of the reinforcement learning is automatically changed according to a change in an environment and a device which trains a model for analyzing or evaluating input data by applying the method.

Aspects of the present disclosure also provide a reinforcement learning method which continuously and autonomously switches between a reinforcement learning direction for accurately detecting a known pattern based on whether input data is data conforming to a known pattern or data of an unknown pattern and a reinforcement learning direction for detecting even an unknown, suspicious pattern and a device which trains a model for analyzing or evaluating input data by applying the method.

Aspects of the present disclosure also provide a reinforcement learning method which can be performed in a low-level computing device with limited computing power and enables learning about the latest data pattern and a device which trains a model for analyzing or evaluating input data by applying the method.

Aspects of the present disclosure also provide a low-level computing device which collects a packet of a device connected to an internal network together with the low-level computing device and detects a threat indicated by the packet and a threat detection system including the low-level computing device.

Aspects of the present disclosure also provide a low-level computing device which performs reinforcement learning on a known threat under the influence of an embedded known pattern evaluation model and performs reinforcement learning on an unknown pattern not detected by the known pattern evaluation model under the influence of an evaluation model continuously updated in a server.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a reinforcement learning method in which a discount factor is automatically adjusted, the method being executed by a computing device and comprising repeatedly training a reinforcement learning model, which determines an evaluation result of input data, using the input data, wherein the repeatedly training of the reinforcement learning model comprises obtaining first result data which is output as a result of inputting the input data to the reinforcement learning model. obtaining second result data which is the result of evaluating the input data using a first evaluation model. obtaining a first return which is the result of adding a discount factor to a first reward given in consideration of whether the first result data and the second result data match. training the reinforcement learning model using the first return and automatically adjusting the discount factor by considering the second result data.

According to another aspect of the present disclosure, there is provided a gateway device having a threat detection function, the gateway device comprising a network interface which is connected to a plurality of devices and collects input data which is at least one of an inbound packet and an outbound packet of each of the devices. a storage which stores data constituting a first evaluation model which detects a plurality of known patterns collected from past packet data and data constituting a reinforcement learning model. a memory which loads a plurality of instructions, the data constituting the first evaluation model and the data constituting the reinforcement learning model and a processor which executes the instructions, wherein the instructions comprise an instruction for obtaining first result data which is output as a result of inputting the input data to the reinforcement learning model, an instruction for obtaining second result data which is the result of evaluating the input data using the first evaluation model, an instruction for obtaining a first return which is the result of adding a discount factor to a first reward given in consideration of whether the first result data and the second result data match, an instruction for training the reinforcement learning model using the first return; an instruction for automatically adjusting the discount factor by considering the second result data and an instruction for outputting the first result data.

According to another aspect of the present disclosure, there is provided a reinforcement learning method executed by a computing device and comprising repeatedly training a reinforcement learning model, which determines an evaluation result of input data, using the input data, wherein the repeatedly training of the reinforcement learning model comprises obtaining first result data which is output as a result of inputting the input data to the reinforcement learning model, obtaining second result data which is the result of evaluating the input data using a first evaluation model, obtaining third result data which is the result of evaluating the input data using a second evaluation model, determining an evaluation model to follow according to the result of comparing the second result data and the third result data and training the reinforcement learning model using a reward determined according to the result of comparing result data of the determined evaluation model and the first result data.

Other features and exemplary embodiments may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 8 illustrates the results of the methods described with reference to FIGS. 6 and 7 on a case-by-case basis.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Hereinafter, embodiments of the present disclosure will be described with reference to the drawings.

Figure 1:
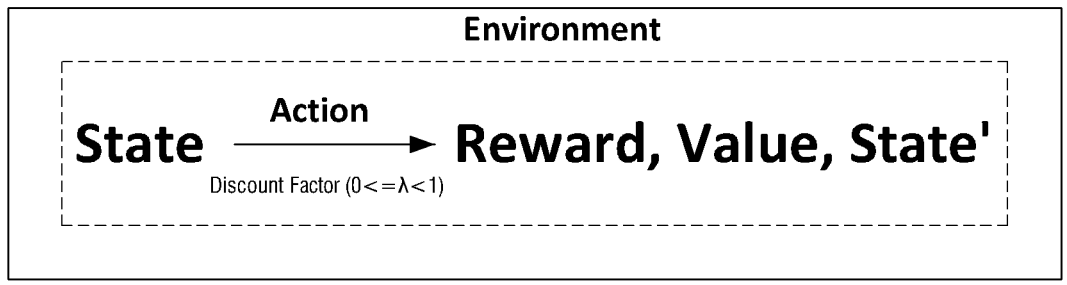
FIG. 1 is a diagram for explaining the concept of improved reinforcement learning applied to embodiments.

First, the concept of improved reinforcement learning applied to embodiments will be described with reference to FIG. 1.

As widely known, reinforcement learning is a process of rewarding an agent for an action when a state changes from a first state State to a second state State as a result of the action taken by the agent and correcting an existing model by reflecting the reward so that the agent can select a better action next time. The agent may select an action for which the currently best reward is given, but may also select an action for which the best total reward is given by further considering later times. Here, a discount factor may be applied to rewards given at later times as is widely known.

Reinforcement learning applied to embodiments is differentiated from conventional reinforcement learning in the following respects. It should be noted that the reinforcement learning applied to embodiments applies some of the following features depending on embodiments.

A first feature: an existing model is corrected by reflecting two things as an environment's feedback on an action taken by an agent. That is, the existing agent model may be corrected by reflecting both a return Gt which is the sum of future discounted rewards and a value of a value function.

Here, while a reward reflected in the calculation of the return is given in consideration of whether the agent's action matches result data output from a first evaluation model, a reward reflected in the calculation of the function value of the value function is given in consideration of whether the agent's action matches result data output from a second evaluation model. That is, the environment's feedback that the agent refers to when correcting the existing model includes the return Gt which reflects whether the result data output from the first evaluation model matches the action selected by the agent and the function value (hereinafter, referred to as a 'value') of the value function which reflects whether the result data output from the second evaluation model matches the action selected by the agent.

In reinforcement learning, the value function (often denoted by v(s)) is a function for obtaining the expectation of the return. The value function may be either a state-value function or an action-value function as is widely known. A value of the action-value function is also referred to as a Q-value. The meaning and examples of the value function can be found in various literatures.

A second feature: a discount factor is automatically adjusted by reflecting the environment in the process of reinforcement learning. In addition, the return Gt and the value described in the first feature are calculated using the same discount factor. Here, the discount factor may be adjusted (to be close to '0') such that the agent follows the result data of the first evaluation model or may be adjusted (to be close to '1') such that the agent follows the result data of the second evaluation model).

In an embodiment, the 'environment' that is reflected when the discount factor is automatically adjusted may denote, for example, which of the result data of the first evaluation model and the result data of the second evaluation model is more accurate. That is, if the first evaluation model shows a better result than the second evaluation model in the 'environment,' the discount factor may be automatically adjusted such that the reinforcement learning model can be corrected to follow the result data of the first evaluation model more than the result data of the second evaluation model.

In an embodiment, in the 'environment,' the first evaluation model may be selected as a model to follow when there is no problem with both the result data of the first evaluation model and the result data of the second evaluation model, and the second evaluation model may be selected as a model to follow when the result data of the first evaluation model is not accurate. If rapid learning is possible or less computing resources or networking resources are consumed when reinforcement learning is performed in the direction of following the first evaluation model as compared with when reinforcement learning is performed in the direction of following the second evaluation model, the current embodiment will be an efficient reinforcement learning strategy.

The second feature will be described by way of example. The first evaluation model is assumed to be a light model that can detect known patterns but can be executed on low-level computing devices. The second evaluation model is assumed to be a model that learns by continuously collecting data to detect known patterns and new patterns, but cannot be executed on low-level computing devices and can be executed on high-level computing devices such as cloud computing environments connected to a network. Here, the discount factor may be automatically adjusted in the direction of following an evaluation model that shows better performance in the 'environment.' However, the discount factor may be automatically adjusted in the direction of following the first evaluation model in an environment in which the first evaluation model and the second evaluation model show the same performance. If the discount factor is adjusted in this way, it is possible to provide resource efficiency that allows reinforcement learning to be performed even in low-level computing devices and environmental adaptability that allows reinforcement learning to be performed by also reflecting the result of the second evaluation model that requires high-level computing resources as the 'environment' changes to an environment in which the second evaluation model shows a more accurate result than the first evaluation model.

Until now, the concept of the improved reinforcement learning applied to embodiments has been described with reference to FIG. 1. Next, an example in which the concept of the reinforcement learning is implemented will be described with reference to FIG. 2.

Figure 2:
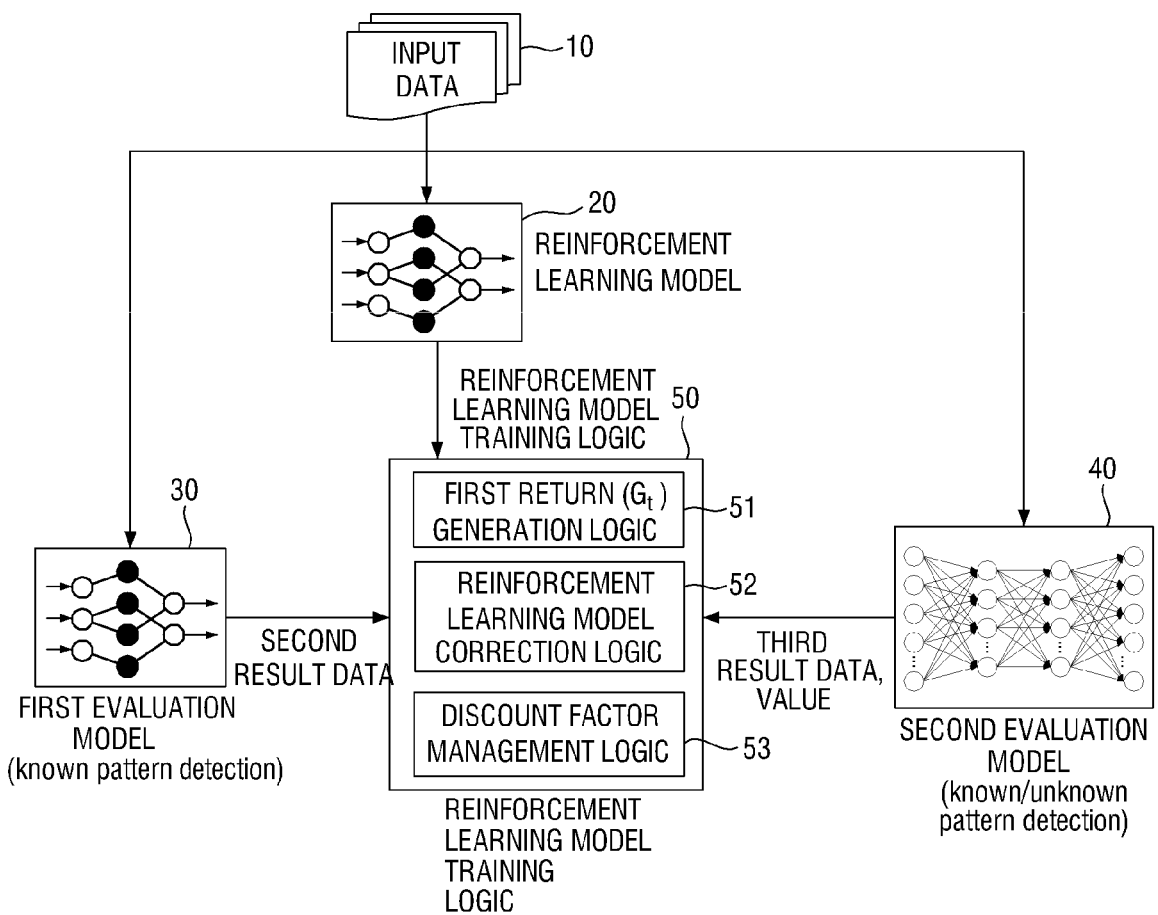
FIG. 2 illustrates an example in which the concept of reinforcement learning described with reference to FIG. 1 is implemented.

A reinforcement learning model 20 illustrated in FIG. 2 performs reinforcement learning through input data 10. That is, in the example of FIG. 2, the 'environment' according to the concept of the reinforcement learning is the input data 10. The reinforcement learning model 20 can be implemented as various models such as Q-learning and deep Q network (DQN).

The reinforcement learning model 20 receives the input data 10 and outputs first result data which is output data. That is, the 'action' according to the concept of the reinforcement learning is the first result data. For ease of understanding, the first result data is assumed to be data indicating the result of evaluating the input data 10. For example, the first result data may be a determination on whether a security threat exists in the input data 10.

The input data 10 may also be provided to a first evaluation model 30. The first evaluation model 30 receives the input data 10 and outputs second result data which is output data. The second result data is also assumed to be a determination on whether a security threat exists is in the input data 10. The first evaluation model 30 may be a model machine-learned to detect a plurality of known patterns indicating the presence of a security threat. Since the first evaluation model 30 has been machine-learned, it may not be able to detect new unknown patterns. Since the first evaluation model 30 has been machine-learned, it may operate independently after being downloaded to a specific computing device. The first evaluation model 30 may be implemented based on an artificial neural network, but may also be implemented as various artificial intelligence-based models for performing classification, clustering, etc. in addition to the artificial neural network.

The input data 10 may also be provided to a second evaluation model 40. The second evaluation model 40 receives the input data 10 and outputs third result data which is output data. The third result data is also assumed to be a determination on whether a security threat exists is in the input data 10. The second evaluation model 40 may be a model that detects at least some of the known patterns and a new pattern not included in the known patterns. The second evaluation model 40 may be stored in a server device connected to the computing device through a network and may be updated periodically or non-periodically to reflect learning results. The second evaluation model 40 may be implemented based on an artificial neural network, but may also be implemented as various artificial intelligence-based models for performing classification, clustering, etc. in addition to the artificial neural network.

The second evaluation model 40 may be generated or updated as a result of collecting various data, periodically/non-periodically constructing the collected data as a training dataset, and learning the training dataset. The data used to construct the training dataset may be collected from various devices in real time or in near-real time.

In an embodiment, the second evaluation model 40 may be a model that is initially trained using at least some of the known patterns and then additionally trained through transfer learning in order to improve the learning speed and the accuracy of a trained model.

A logic 50 for training the reinforcement learning model 20 will now be described.

Referring to FIG. 2, the reinforcement learning model training logic 50 (hereinafter, referred to as 'training logic') refers to the first result data and the second result data. The training logic 50 refers to a first return Gt in order to correct (which can be understood as having the same meaning as 'train' and 'learn') the reinforcement learning model 20. The first return is a value that can be calculated using, e.g., Equation 1. The first return may be calculated by a first return generation logic 51 and provided to a reinforcement learning model correction logic 52.

A first reward needed to calculate the first return is given in consideration of whether the first result data and the second result data match. As described above, the reinforcement learning model 20 is trained to follow the first evaluation model 30 or the second evaluation model 40. Therefore, the first reward will have a positive value if the first result data and the second result data indicate the same conclusion and will have a negative value if the first result data and the second result data indicate different conclusions. However, if the reinforcement learning progresses to some extent, the first result data can be correct, and the second result data can be incorrect. In addition, if the difficulty of detecting a pattern included in the input data 10 is too low, the reward may be set to zero even if the first result data and the second result data indicate the same conclusion. Giving the first reward in consideration of whether the first result data and the second result data match can be understood as comprehensively expressing these situations.

In threat detection, based on what criterion the first reward is given will be described later with reference to FIG. 8. The first reward can be understood as a current reward for an action selected by an agent in that it reflects whether detection of a known pattern is correct. In the threat detection, how the first reward is given in consideration of whether the first result data and the second result data match will be described later with reference to FIG. 8.

In addition, a discount factor A needed to calculate the first return may be received from a discount factor management logic 53 which automatically adjusts the discount factor. The discount factor management logic 53 automatically adjusts the discount factor by considering the second result data.

The discount factor management logic 53 may adjust the discount factor by a variable amount according to situation. For example, the discount factor may be adjusted by a smaller amount as the input data 10 is received more frequently, so that the discount factor can be prevented from being adjusted too quickly to both extremes ('0' or '1'). In addition, for example, if the consistency of the input data 10 is maintained, the amount of adjustment may be increased to control the pattern followed by the reinforcement learning model 20 to rapidly change from the first evaluation model 30 to the second evaluation model 40 or from the second evaluation model 40 to the first evaluation model 30. For example, if the discount factor is continuously increased to more than a predetermined reference level or is continuously decreased, the amount of adjustment of the discount factor may be increased. This indicates that the pattern included in the input data 10 has changed to a conventional known pattern or a new unknown pattern due to various reasons, and, if this situation has been maintained for a certain period of time, it is desirable to quickly reflect this situation change. In the threat detection, based on what criterion the discount factor is automatically adjusted will be described later with reference to FIG. 8.

The training logic 50 may also correct the reinforcement learning model 20 and automatically adjust the discount factor by referring to the third result data in addition to the first result data and the second result data.

In some embodiments, if the first evaluation model 30 is a model that detects a plurality of known patterns, the third result data may be further referred to when the first result data indicates that one or more of the known patterns have not been detected. This is because if the first evaluation model 30 detects a specific pattern, the result is reliable, and thus there is no need to refer to the result data of the second evaluation model 40 by consuming computing and networking resources as well as time.

To this end, the first result data, the input data 10, and the current discount factor managed by the discount factor management logic 53 may be shared to the second evaluation model 40. In a computing environment in which the second evaluation model 40 is run, a value (an output value of the value function) which is the expectation of a second return obtained as a result of adding the shared discount factor to a second reward may be provided using the shared discount factor, the first result data, and the shared input data 10. Here, the second reward is given based on whether the first result data and the third result data match.

In the threat detection, based on what criterion the second reward is given will be described later with reference to FIG. 8. The second reward can be understood as a future reward for an action selected by an agent in that it constitutes the expectation of a return. In the threat detection, how the second reward is given in consideration of whether the first result data and the third result data match will be described later with reference to FIG. 8.

When the reinforcement learning model 20 is corrected by referring to the third result data in addition to the first result data and the second result data, the reinforcement learning correction logic 52 may train the reinforcement learning model 20 using the first return Gt and the value, and the discount factor management logic 53 may adjust the discount factor by considering whether the first result data and the third result data match in addition to considering the second result data. In the threat detection, based on what criterion the discount factor is automatically adjusted will be described later with reference to FIG. 8.

Figure 3:
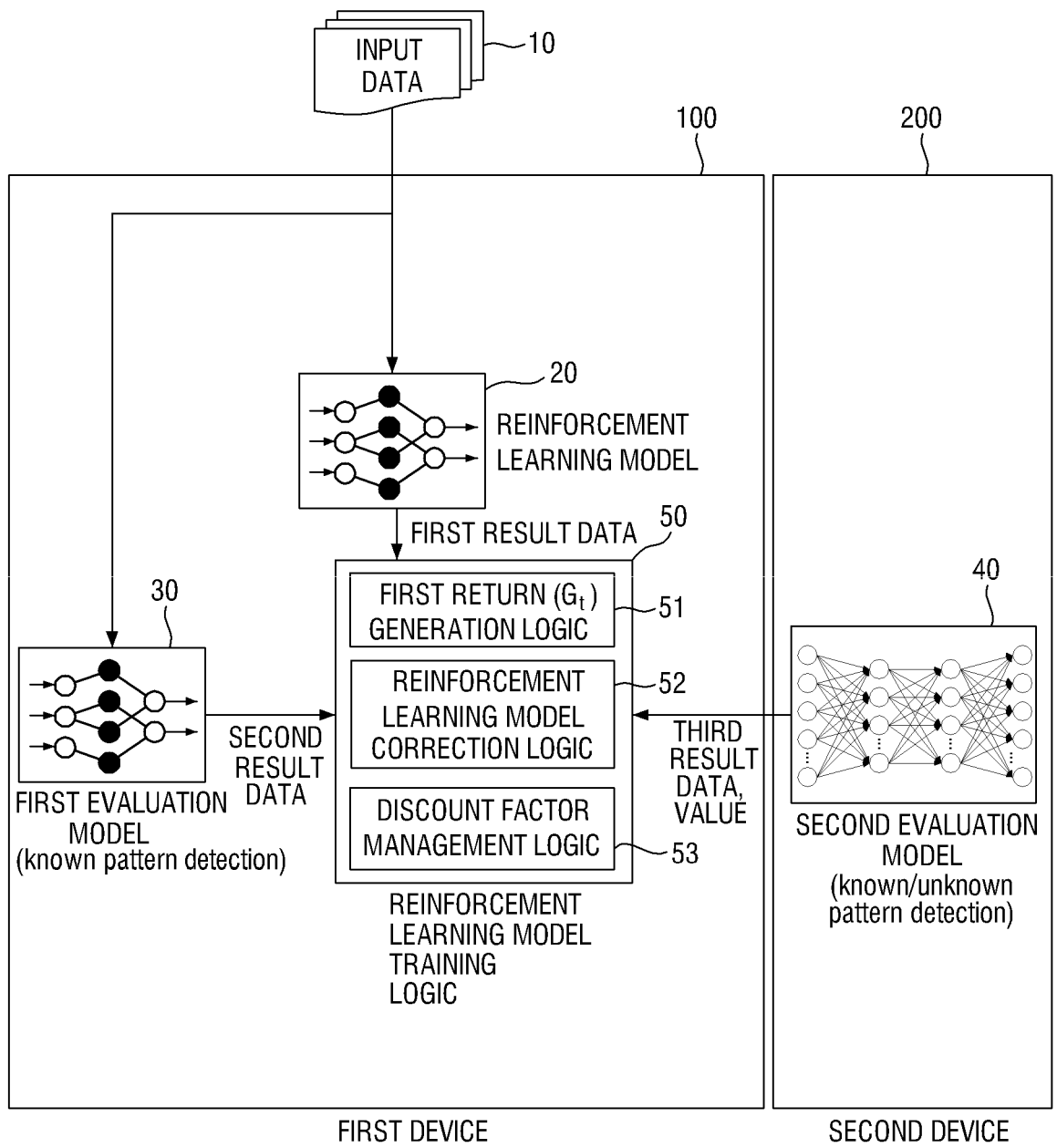
FIG. 3 illustrates an example in which functions are divided among a plurality of devices in the implementation of reinforcement learning described with reference to FIG. 2.

In some embodiments, referring to FIG. 3, a first device 100 may execute the first evaluation model 30, the reinforcement learning model 20 and the training logic 50, and a second device 200 may execute the second evaluation model 40. Here, the first device 100 may be a low-performance computing device as compared with the second device 200. Since the first evaluation model 30 is a light model that detects known patterns, it can be fully executed on a low-performance computing device. In addition, the reinforcement learning model 20 and the training logic 50 do not require high performance at the server level. In some embodiments, however, a computing device that executes the first evaluation model 30 and a computing device that executes the reinforcement learning model 20 and the training logic 50 may be physically different devices, unlike in FIG. 3.

A system in which the first device 100 is connected to a plurality of devices, constructs the input data 10 by collecting at least one of an inbound packet and an outbound packet of each of the devices, executes the first evaluation model 30, the reinforcement learning model 20 and the training logic 50, and detects a security threat to the devices by transmitting a request to the second device 200 that executes the second evaluation model 40 and receiving a response to the request from the second device 200 may be configured. The configuration and operation of this threat detection system according to an embodiment will now be described with reference to FIG. 4.

The threat detection system according to the current embodiment includes a server device 200b and a gateway device 100a. The gateway device 100a is connected to a plurality of devices through an internal network 300 and collects at least one of an inbound packet and an outbound packet of each of the devices. This packet collection can be easily performed when the gateway device 100a is directly connected to the devices in the internal network 300 or when the gateway device 100a is a device that relays inbound packets and outbound packets of the devices. However, the case where the devices are connected to the gateway device 100a in the internal network 300 is just one embodiment, and embodiments are not limited to the case where the devices are connected to the gateway device 100a in the internal network 300.

Figure 4:
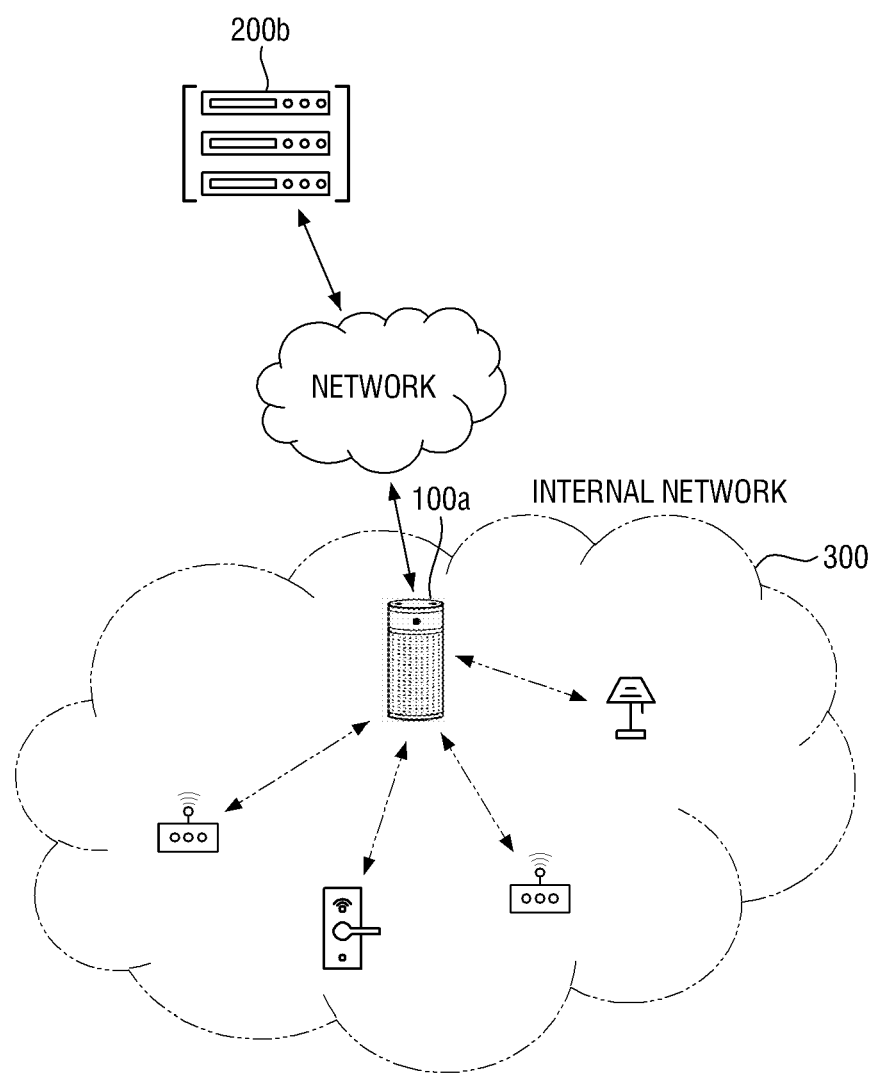
FIG. 4 illustrates the configuration of a threat detection system according to an embodiment.

FIG. 4 illustrates a case where the gateway device 100a relays inbound packets and outbound packets of various devices such as an Internet of things (IoT) sensor, a digital door lock and a smart lamp in a smart home when the inbound packets and the outbound packets are transmitted or received to or from an external network (e.g., the Internet). The gateway device 100a may be, for example, a smart speaker, an access point (AP), an IoT hub, or various other computing devices. As described above, the gateway device 100a may also be a device with low-level computing specifications.

The hardware configuration of the gateway device according to the current embodiment will be described with reference to FIG. 5.

Figure 5:
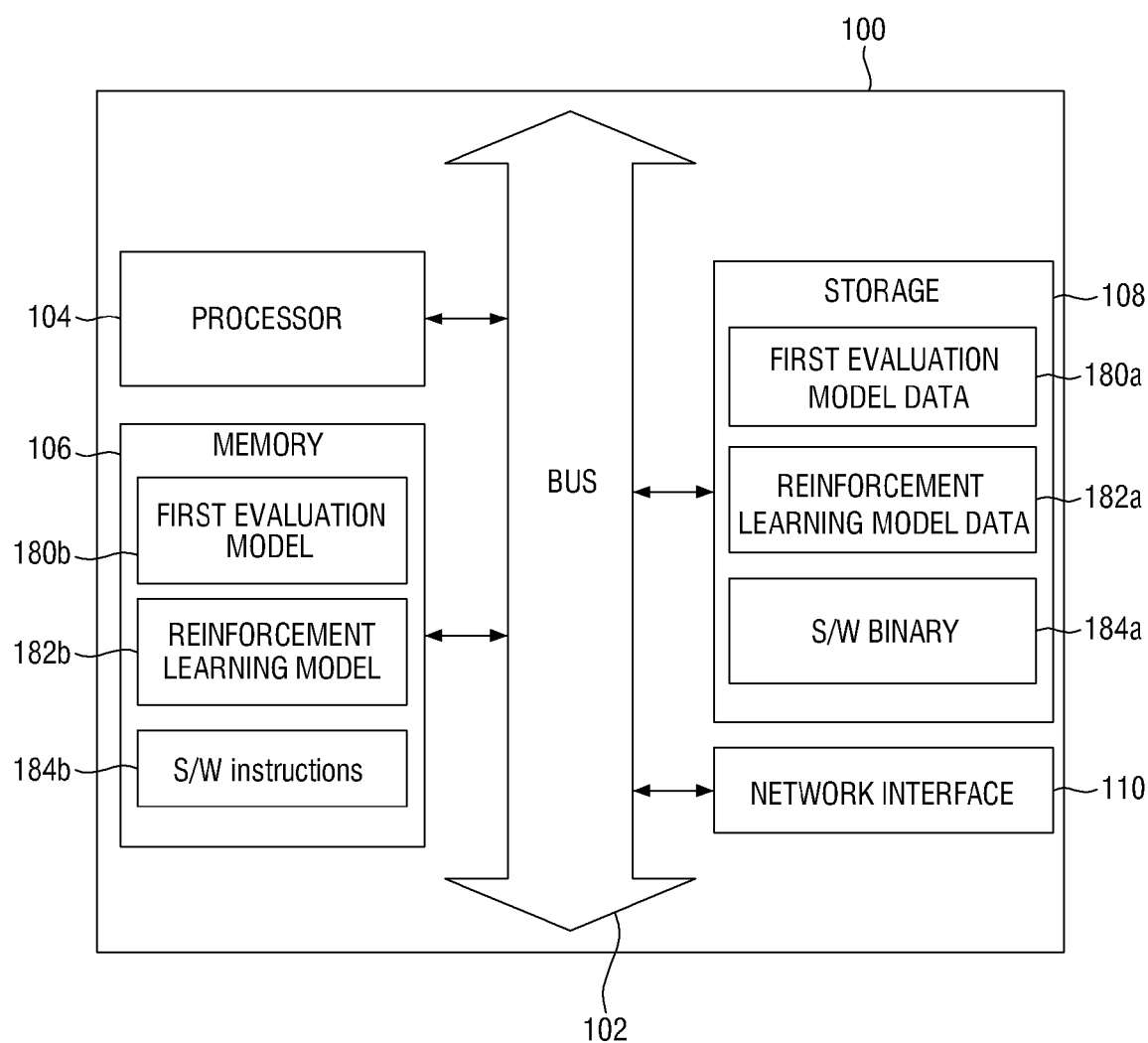
FIG. 5 illustrates the configuration of a gateway device according to an embodiment.

Referring to FIG. 5, the gateway device 100 according to the current embodiment includes a processor 104, a memory 106, a storage 108, and a network interface 110.

The network interface 110 is connected to a plurality of devices and collects input data which is at least one of an inbound packet and an outbound packet of each of the devices.

The storage 108 stores data 180a that constitutes a first evaluation model for detecting a plurality of known patterns collected from past packet data and data 182a that constitutes a reinforcement learning model. The storage 108 may also store a software binary 184a for performing a method according to embodiments.

The memory 106 loads a plurality of instructions 184b constructed as a result of loading the software binary 184a, loads the data 180b constituting the first evaluation model, and loads the data 182b constituting the reinforcement learning model.

The processor 104 executes the instructions 184b.

The instructions 184b may include an instruction for obtaining first result data which is output as a result of inputting the input data to the reinforcement learning model, an instruction for obtaining second result data which is the result of evaluating the input data using the first evaluation model, an instruction for obtaining a first return which is the result of adding a discount factor to a first reward given in consideration of whether the first result data and the second result data match, an instruction for training the reinforcement learning model using the first return, an instruction for automatically adjusting the discount factor by considering the second result data, and an instruction for outputting the first result data.

The instructions may further include an instruction for transmitting a request signal for obtaining a value to a server device through the network interface 110 if the first result data indicates that one or more of the known patterns have not been detected, wherein the value is the expectation of a second return which is the result of adding the discount factor to a second reward given based on whether the first result data and the third result data match. Here, the instruction for training the reinforcement learning model may include an instruction for training the reinforcement learning model using the first return and the value. In addition, the instruction for automatically adjusting the discount factor may include an instruction for adjusting the discount factor by further considering whether the first result data and the third result data match. The request signal may include the input data and discount factor data.

In addition, in an embodiment, the instruction for adjusting the discount factor by further considering whether the first result data and the third result data match may include an instruction for automatically increasing the discount factor if the first result data indicates that no pattern has been detected, whereas the third result data indicates that a pattern has been detected.

In addition, in an embodiment, the instruction for automatically adjusting the discount factor by considering the second result data may include an instruction for automatically reducing the discount factor if the second result data indicates that one or more of the known patterns have been detected.

Figure 6:
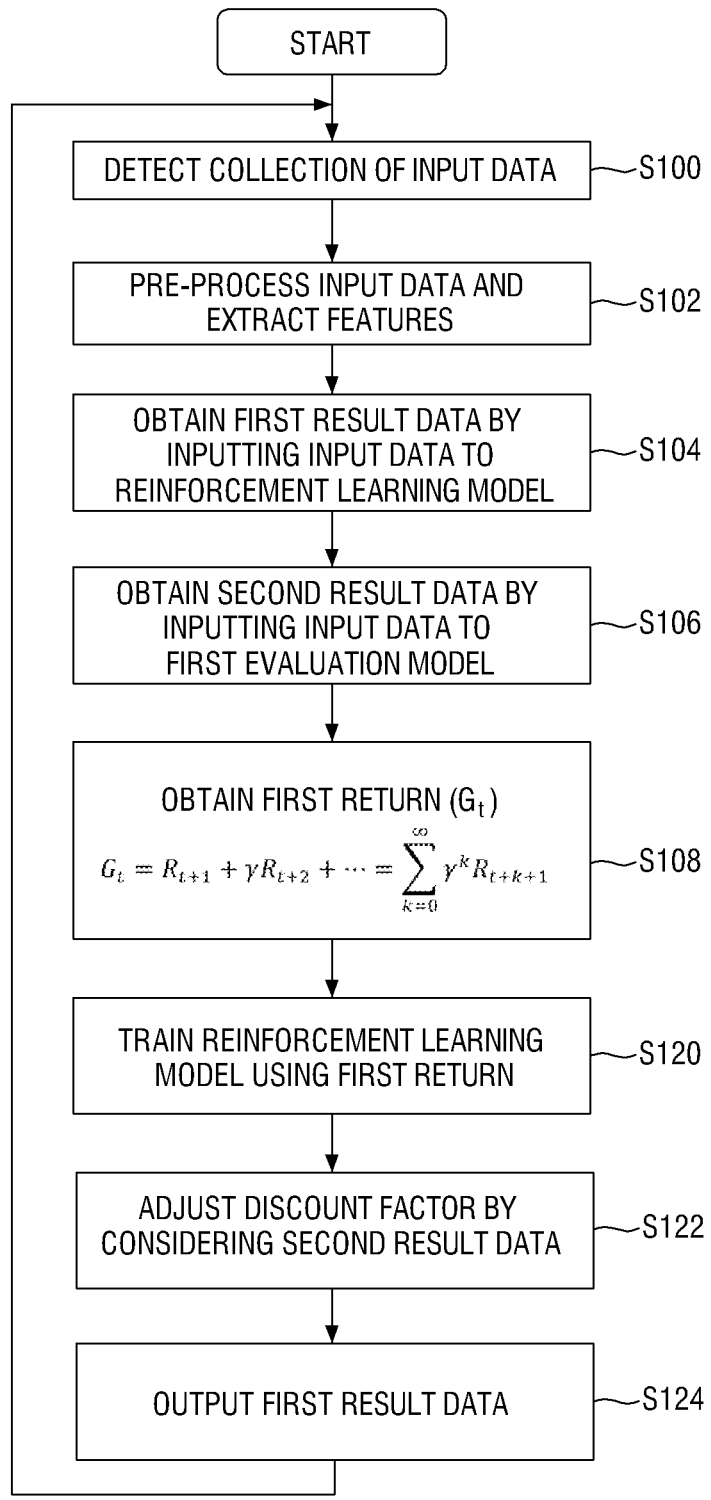
FIG. 6 is a flowchart illustrating a reinforcement learning method according to an embodiment.

A reinforcement learning method according to an embodiment will now be described with reference to FIGS. 6 and 7. For ease of understanding, what has been described above will now be described again, but the technical construction and technical idea of the embodiments described above can be applied to the reinforcement learning method according to the current embodiment. The method according to the current embodiment may be performed by a computing device. The computing device may be, for example, the gateway device 100a of FIG. 4. However, it should be noted that, in some embodiments, the method according to the current embodiment can be performed in a divided manner by a plurality of physically separate computing devices.

In operation S100, collection of input data is detected. If the input data is an inbound packet or an outbound packet of a device, one packet may be configured as one input data, or a predetermined number of successive packets may be configured as one input data. Example data to be collected is shown in Table 1 below.

TABLE 1

Traffic data (data_traffic): generation or collection

| Item | Description | Type | Note |
| --- | --- | --- | --- |
| Timestamp | Traffic generation time | Datetime | Aggregated in minutes |
| Mac_address | Mac address of internal IoT equipment | String | Used instead of internal_ip in consideration of an IP change due to the use of DHCP |
| Internal_port | Internal port | Integer | (1~65535) |
| External_ip | External IP | String | Class-based information extraction may be used |
| External_port | External port | Integer | (1~65535) |
| Direction_flag | Transmission direction | Boolean | (0: IN, 1: OUT) |
| Protocol | Protocol | String | TCP/UDP |
| Packet_count | Packet count | Integer | |
| Packet_size | Packet size | Integer | |

In operation S102, the input data is pre-processed, and its features are extracted. The inventors of the present disclosure selected a total of 41 packet features suitable for threat detection through long-term research. The 41 features are shown in Tables 2 through 5 below.

[Table 2]
Basic features (9)
Basic information of network connection
Packet content related features (13)
Composed of features needed to analyze suspicious behaviors based on domain knowledge
Time window-based features (9)
Statistics are calculated on connections to the same destination host or the same service
All features are analyzed based on a time window for the last two seconds
Host-based features (10)
Statistics are calculated on connections to the same destination host

TABLE 3

[List of basic features]

| o. | Feature | Description | Type |
|---|---|---|---|
|  | Duration | Length of the connection (in seconds) | Numeric |
|  | Protocol_type | Type of protocol (e.g., tcp, udp) | Nominal |
|  | Service | Network service on the destination (e.g., http, telnet) | Nominal |
|  | Flag | State at the time of connection termination (SF: normal SYN/FIN termination, REJ: connection rejected, etc.) | Nominal |
|  | Src_bytes | Number of data bytes transferred from source to destination | Numeric |
|  | Dst_bytes | Number of data bytes transferred from destination to source | Numeric |
|  | Land | 1 if source and destination IP addresses and ports are the same; 0 otherwise | Binary |
|  | Wrong_fragment | Number of wrong fragments | Numeric |
|  | Urgent | Number of urgent packets (urgent packet: a packet having an urgent (URG) bit marked as activate | Numeric |

TABLE 4

[List of packet content related features]

| o. | Feature | Description | Type |
|---|---|---|---|
| 0 | Hot | Number of "hot" indicators such as system directory access and program creation or execution | Numeric |
| 1 | Num_failed_logins | Number of failed login attempts | Numeric |
| 2 | Logged_in | 1 if successfully logged in; 0 otherwise | Binary |
| 3 | Num_compromised | Number of "compromised" conditions | Numeric |
| 4 | Root_shell | 1 if root shell is obtained; 0 otherwise | Binary |
| 5 | Su_attempted | 1 if "su root" command attempted; 0 otherwise | Binary |
| 6 | Num_root | Number of root accesses or root authority commands executed | Numeric |
| 7 | Num_file_creations | Number of file creation operations | Numeric |
| 8 | Num_shells | Number of shell prompts | Numeric |
| 9 | Num_access_files | Number of operations on access control files | Numeric |
| 0 | Num_outbound_cmds | Number of outbound commands in an ftp session | Numeric |
| 1 | Is_host_login | 1 if the login (such as root or admin) belongs to the "hot" list; 0 otherwise | Binary |
| 2 | Is_guest_login | 1 if the login is a guest login; 0 otherwise | binary |

TABLE 5

[List of host-based features]

| o. | Feature | Description | type |
|---|---|---|---|
| 2 | Dst_host_count | Number of connections to the same destination host IP address | Numeric |
| 3 | Dst_host_srv_count | Number of connections to the same port | Numeric |
| 4 | Dst_host_same_srv_rate | Ratio of the number of connections to the same service to the number of connections to the same destination host | Numeric |
| 5 | Dst_host_diff_srv_rate | Ratio of the number of connections to different services to the number of connections to the same destination host | Numeric |
| 6 | Dst_host_same_src_port_rate | Ratio of the number of connections from the same source port to the number of connections to the same port | Numeric |
| 7 | Dst_host_srv_diff_host_rate | Ratio of the number of connections to different destination machines to the number of connections to the same port | Numeric |
| 8 | Dst_host_serror_rate | Ratio of the number of connections that have SYN errors to the number of connections to the same destination host | Numeric |
| 9 | Dst_host_srv_serror_rate | Ratio of the number of connections that have SYN errors to the number of connections to the same port | Numeric |
| 0 | Dst_host_rerror_rate | Ratio of the number of connections that have REJ errors to the number of connections to the same destination host | Numeric |
| 1 | Dst_host_srv_rerror_rate | Ratio of the number of connections that have REJ errors to the number of connections to the same port | Numeric |

In operation S104, first result data is obtained by inputting the input data to a reinforcement learning model. In operation S106, second result data is obtained by inputting the input data to a first evaluation model. Next, in operation S108, a first return is obtained by adding a discount factor to a first reward given in consideration of whether the first result data and the second result data match.

In operation S120, the reinforcement learning model is trained using the first return. In addition, in operation S122, the discount factor is adjusted by considering the second result data. The adjusting of the discount factor will be described in detail later with reference to FIG. 8. In operation S124, the first result data is output as an analysis or evaluation result of the input data.

Figure 7:
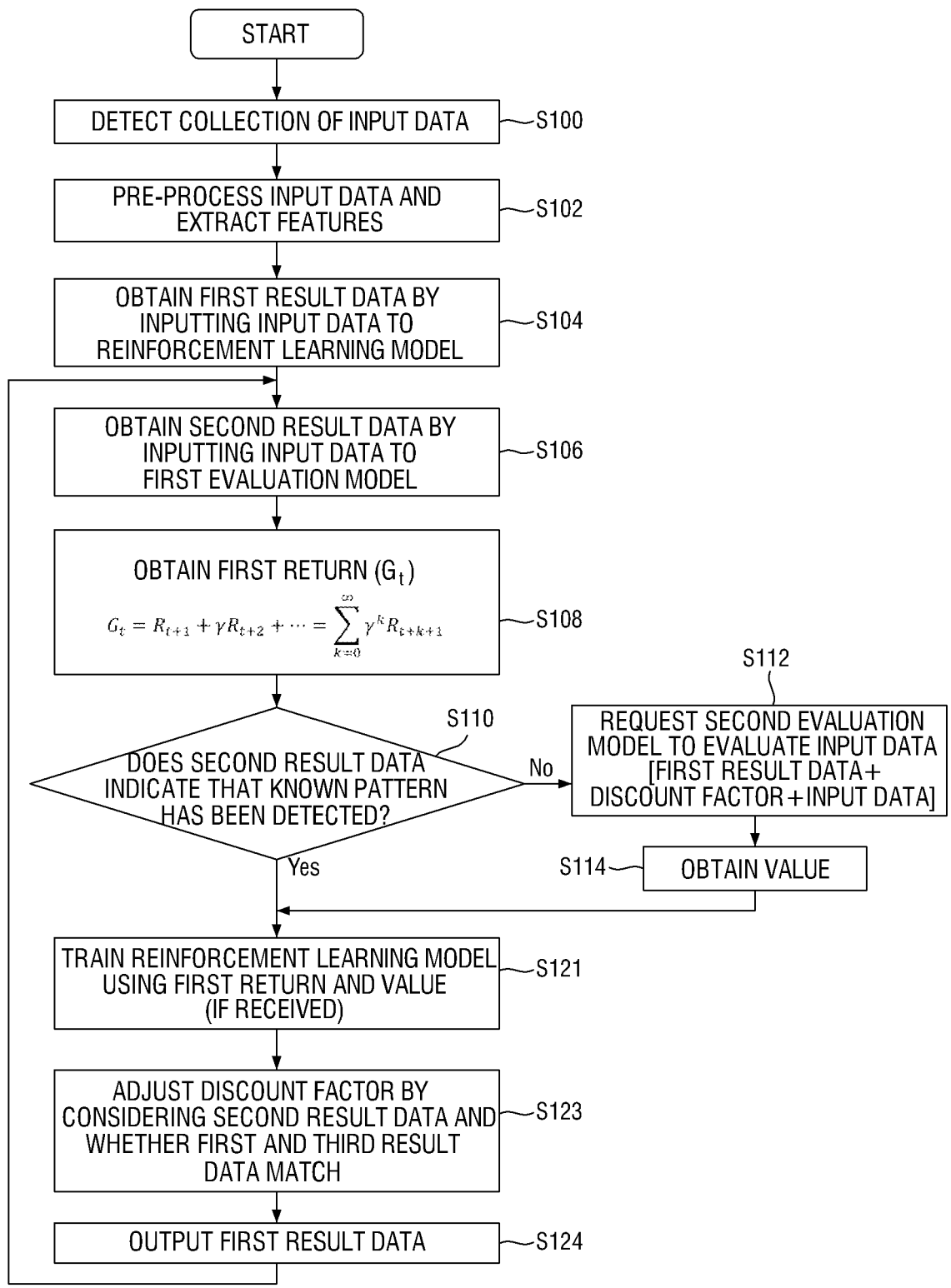
FIG. 7 is a flowchart illustrating a modification of the method described with reference to FIG. 6.

In some embodiments, referring to FIG. 7, reinforcement learning may be performed by further considering result data of a second evaluation model for the input data. To this end, if the second result data of the first evaluation model indicates that no known pattern has been detected in the input data in operation S110, a signal for requesting the evaluation of the input data may be transmitted to a computing device that executes the second evaluation model in operation S112. Here, the signal may include the first result data which is the evaluation result of the reinforcement learning model for the input data, a current discount factor, and the input data. In operation S114, the computing device that executes the second evaluation model may provide a value as a response to the signal.

Next, the reinforcement learning model may be trained using the first return and the value in operation S121, and the discount factor may be adjusted by considering whether the first result data and third result data match and considering the second result data in operation S123. In addition, in operation S124, the first result data is output as an analysis or evaluation result of the input data.

The method according to the current embodiment will now be described more specifically with reference to FIG. 8.

FIG. 8 illustrates a first reward, a second reward, and automatic adjustment of a discount factor in each case based on the premise that the method according to the current embodiment is used for threat detection through packet data analysis. In addition, a first evaluation model is a model that detects known patterns, and a second evaluation model is a result model of threat pattern detection machine learning which is continuously updated in, e.g., a cloud server. That is, it can be understood that a gateway device should make a request to the cloud server in order to have input data evaluated by the second evaluation model. the first evaluation model and a reinforcement learning model can be understood as being embedded in the gateway device.

If the first evaluation model evaluates input data as a threat detected, since this result is reliable, there is no need for the intervention of the second evaluation model. In an environment in which the input data evaluated by the first evaluation model as a threat detected is generated, it is desirable to perform reinforcement learning in a manner that follows the result of the first evaluation model. Therefore, a discount factor is reduced. Here, a positive (+) first reward is given if first result data obtained as a result of evaluating the input data using the reinforcement learning model matches second result data obtained as a result of evaluating the same input data using the first evaluation model, and a negative (−) first reward is given if the first result data does not match the second result data. If the reinforcement learning model evaluates the input data as normal although the first evaluation model evaluates the input data as a threat detected, an absolute value of the negative first reward (−) may be increased to prevent the reinforcement learning model from missing a known pattern in the future.

That is, in some embodiments, the discount factor may be adjusted by considering whether the second result data of the first evaluation model indicates the input data as a threat detected. If the first evaluation model evaluates the input data as a threat detected, the discount factor is reduced.

If the first evaluation model evaluates the input data as normal, it may be a case where the input data is actually normal or a case were an unknown threat pattern exists in the input data. Therefore, an additional request may be sent to the second evaluation model to evaluate the input data and perform reinforcement learning by reflecting the result. Here, if the second evaluation model also evaluates the input data as normal, the discount factor need not be changed. In addition, the second reward will be given according to whether the first result data and third result data match. If it is evaluated that the first result data and the third result data match, a positive (+) second reward is given. Conversely, if the first result data and the third result data do not match, that is, if the reinforcement learning model evaluates the input data as a threat detected although both the first evaluation model and the second evaluation model evaluate the input data as normal, a negative (−) second reward is given. In this case, an absolute value of the negative (−) second reward may be increased to prevent the reinforcement learning model from misjudging a normal pattern as a threat detected in the future.

If the second evaluation model evaluates the input data as a threat detected although the first evaluation model evaluates the input data as normal, this can be understood as a case where a threat of an unknown pattern exists in the input data. In this case, the discount factor may be automatically increased so that the reinforcement model can detect even unknown patterns through reinforcement learning. Here, the second reward will be given according to whether the first result data and the third result data match. A positive (+) reward will be given if the first reinforcement learning model evaluates the input data as a threat detected, like the second evaluation model, and a negative (−) reward will be given if the reinforcement learning model evaluates the input data as normal.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A reinforcement learning method in which a discount factor is automatically adjusted, the method being executed by a computing device and comprising:
repeatedly training a reinforcement learning model, which determines an evaluation result of input data, and using the input data, wherein repeatedly training the reinforcement learning model comprises:
obtaining first result data which is output as a result of inputting the input data to the reinforcement learning model;
obtaining second result data which is the result of evaluating the input data using a first evaluation model that is used to detect a plurality of known patterns indicating a presence of a security threat;
obtaining a first return which is a result of adding the discount factor to a first reward given in consideration of whether the first result data and the second result data match, wherein the discount factor is a real number between 0 and 1 and is set to a specific value so that a learning direction of the model is reflected at a start of reinforcement learning and wherein the first reward is a positive value if the first result data matches the second result data and is negative otherwise;
training the reinforcement learning model using the first return; and
automatically adjusting the discount factor by considering the second result data.

2. The method of claim 1, wherein automatically adjusting the discount factor comprises adjusting the discount factor by a smaller amount as the input data is received more frequently.

3. The method of claim 1, wherein repeatedly training the reinforcement learning model further comprises obtaining a value which is an expectation of a second return obtained as a result of adding the discount factor to a second reward given based on whether the first result data and third result data match and wherein training the reinforcement learning model comprises training the reinforcement learning model using the first return and the value, wherein automatically adjusting the discount factor comprises adjusting the discount factor by further considering whether the first result data and the third result data match, and wherein the third result data is the result of evaluating the input data using a second evaluation model.

4. The method of claim 3, wherein the first evaluation model is a model that detects a plurality of known patterns, wherein obtaining the value comprises obtaining the value based on the first result data, and wherein the first result data indicates that a detected signal is different from the one or more of the known patterns.

5. The method of claim 3, wherein the first evaluation model is a model that detects a plurality of known patterns and is comprised of data downloaded to the computing device, and the second evaluation model is a model that detects at least some of the known patterns and a new pattern that is different from the known patterns, is stored in a server device connected to the computing device through a network and is updated periodically or non-periodically to reflect learning results.

6. The method of claim 5, wherein the second evaluation model is a model that is initially trained using at least some of the known patterns and additionally trained through transfer learning.

7. The method of claim 3, wherein the first evaluation model is a model that detects a plurality of known patterns collected from past data, and automatically adjusting the discount factor comprises further considering whether the second result data indicates that one or more of the known patterns have been detected.

8. The method of claim 7, wherein automatically adjusting the discount factor by further considering whether the second result data indicates that one or more of the known patterns have been detected comprises automatically reducing the discount factor, and wherein the second result data indicates that one or more of the known patterns have been detected.

9. The method of claim 7, wherein the second evaluation model is a model that detects at least some of the known patterns and a new pattern that is different from the known patterns and is updated to reflect the result of machine learning performed using data collected, wherein automatically adjusting the discount factor by considering the second result data further comprises automatically increasing the discount factor, and wherein the first result data indicates that a detected signal is different from the known patterns and the new pattern and the third result data indicates that a pattern has been detected that corresponds to at least one of the known patterns and the new pattern.

10. The method of claim 3, wherein the input data is at least one of an inbound packet and an outbound packet of a device connected to the computing device through an internal network, wherein the first evaluation model is a model that detects a plurality of known patterns collected from past packet data and is stored in the computing device, wherein the second evaluation model is a model that detects at least some of the known patterns and a new pattern different from the known patterns, wherein the second evaluation model is updated to reflect the result of machine learning performed using data collected and is stored in an external device connected to the computing device through an external network, and wherein data constituting the reinforcement learning model is stored in the computing device.

11. The method of claim 3, wherein the input data is time-series data of sensor values transmitted from an Internet of things (IoT) sensor connected to the computing device through the internal network, wherein the first evaluation model is a model that detects a plurality of known patterns collected from past time-series data of sensor values and is stored in the computing device, wherein the second evaluation model is a model that detects at least some of the known patterns and a new pattern different from the known patterns, wherein the second evaluation model is updated to reflect the result of machine learning performed using data collected and is stored in an external device connected to the computing device through an external network, and wherein data constituting the reinforcement learning model is stored in the computing device.

12. The method of claim 3, wherein the second evaluation model is a model that detects at least some of the known patterns and a new pattern different from the known patterns and is updated to reflect the result of machine learning performed using data collected, and wherein the second reward has a negative value, wherein the first result data and the third result data do not match wherein an absolute value of the second reward when the first result data indicates that a pattern has been detected and the third result data indicates that a pattern detected is different than the known patterns and the new pattern is greater than an absolute value of the second reward, wherein the first result data indicates that the pattern detected is different than the known patterns and the new pattern, and wherein the third result data indicates that a pattern has been detected.

13. The method of claim 1, wherein the first evaluation model is a model that detects a plurality of known patterns collected from past data, and wherein the first reward has a negative value, wherein the first result data is different than the second result data, wherein an absolute value of the first reward indicates that a pattern has been detected, wherein the first result data indicates that a detected signal is different from the known patterns, and wherein the second result data is greater than an absolute value of the first reward when the first result data indicates that a pattern has been detected and the second result data indicates that no pattern has been detected.

14. A gateway device having a threat detection function, the gateway device comprising:
a network interface which is connected to a plurality of devices and collects input data which is at least one of an inbound packet and an outbound packet of each of the devices;
a storage which stores data constituting a first evaluation model which detects a plurality of known patterns collected from past packet data and data constituting a reinforcement learning model;
a memory which loads a plurality of instructions, the data constituting the first evaluation model and the data constituting the reinforcement learning model; and
a hardware processor which executes the instructions, wherein the instructions comprise:
an instruction for obtaining first result data which is output as a result of inputting the input data to the reinforcement learning model;
an instruction for obtaining second result data which is the result of evaluating the input data using the first evaluation model that is used to detect a plurality of known patterns indicating a presence of a security threat;
an instruction for obtaining a first return which is a result of adding a discount factor to a first reward given in consideration of whether the first result data and the second result data match, wherein the discount factor is a real number between 0 and 1 and is set to a specific value so that a learning direction of the model is reflected at a start of reinforcement learning and wherein the first reward is a positive value if the first result data matches the second result data and is negative otherwise;

an instruction for training the reinforcement learning model using the first return;

an instruction for automatically adjusting the discount factor by considering the second result data; and an instruction for outputting the first result data.

15. The gateway device of claim 14, wherein the instructions further comprise an instruction for transmitting a request signal for obtaining a value to a server device through the network interface, wherein the first result data indicates that a detected signal is different than the known patterns, wherein the instruction for training the reinforcement learning model comprises using the first return and the value, wherein the instruction for automatically adjusting the discount factor comprises further considering whether the first result data and third result data match, wherein the value is an expectation of a second return which is the result of adding the discount factor to a second reward given based on whether the first result data and the third result data match, wherein the third result data is the result of evaluating the input data using a second evaluation model, and wherein the request signal comprises the input data and discount factor data.

16. The gateway device of claim 15, wherein the instruction for automatically adjusting the discount factor further comprises automatically increasing the discount factor, and wherein the first result data indicates that a detected signal is different from the known patterns and the third result data indicates that a pattern has been detected.

17. The gateway device of claim 14, wherein the instruction for automatically adjusting the discount factor further comprises an instruction for automatically reducing the discount factor, and wherein the second result data indicates that one or more of the known patterns have been detected.

18. A reinforcement learning method executed by a computing device and comprising:

repeatedly training a reinforcement learning model, which determines an evaluation result of input data, and using the input data, wherein the repeatedly training of the reinforcement learning model comprises:

obtaining first result data which is output as a result of inputting the input data to the reinforcement learning model that is used to detect a plurality of known patterns indicating a presence of a security threat;

obtaining second result data which is the result of evaluating the input data using a first evaluation model;

obtaining third result data which is the result of evaluating the input data using a second evaluation model;

determining an evaluation model to follow according to a conclusion data of comparing the second result data and the third result data; and training the reinforcement learning model using a reward determined according to a fourth result of comparing the conclusion data of the determined evaluation model and the first result data, wherein the reward is needed to calculate a return value in consideration of whether a match can be determined after the comparison and the reward is a positive value if matched and otherwise is negative and wherein further training the reinforcement learning model using the calculated return value.

* * * * *